(12) United States Patent
Negreiro

(10) Patent No.: US 7,110,963 B2
(45) Date of Patent: Sep. 19, 2006

(54) POINT-OF-SALE CUSTOMER ORDER SYSTEM UTILIZING AN UNOBTRUSIVE TRANSMITTER/RECEIVER AND VOICE RECOGNITION SOFTWARE

(76) Inventor: Manuel Negreiro, 8912 Crest Wood Dr., Fort Worth, TX (US) 76179

( * ) Notice: Subject to any disclaimer, the term of this patent is extended or adjusted under 35 U.S.C. 154(b) by 665 days.

(21) Appl. No.: 09/948,881

(22) Filed: Sep. 7, 2001

(65) Prior Publication Data

US 2002/0049598 A1   Apr. 25, 2002

Related U.S. Application Data

(60) Provisional application No. 60/230,681, filed on Sep. 7, 2000.

(51) Int. Cl.
*G06Q 30/00* (2006.01)
(52) U.S. Cl. ............... 705/15; 705/16; 705/26; 704/275
(58) Field of Classification Search ........ 704/211, 704/275, 270, 16, 270.1; 345/716; 379/88.04, 379/96; 395/2.84
See application file for complete search history.

(56) References Cited

U.S. PATENT DOCUMENTS

| | | | | |
|---|---|---|---|---|
| 5,357,596 A | * | 10/1994 | Takebayashi et al. | 704/275 |
| 5,583,922 A | * | 12/1996 | Davis et al. | 379/93.09 |
| 6,064,963 A | * | 5/2000 | Gainsboro | 704/270 |
| 6,108,632 A | * | 8/2000 | Reeder et al. | 704/275 |
| 6,269,336 B1 | * | 7/2001 | Ladd et al. | 704/270 |
| 6,446,076 B1 | * | 9/2002 | Burkey et al. | 707/102 |
| 6,567,787 B1 | * | 5/2003 | Walker et al. | 705/16 |
| 6,594,632 B1 | * | 7/2003 | White | 704/270 |

* cited by examiner

*Primary Examiner*—David Hudspeth
*Assistant Examiner*—Jakieda R. Jackson
(74) *Attorney, Agent, or Firm*—Charles D. Gunter, Jr.; Melvin A. Hunn; Stephen S. Mosher

(57) ABSTRACT

A point-of-sale order system utilizes a relatively non-obtrusive transmitter-receiver device which includes a microphone for receiving order information and a speaker for receiving confirmation of the order information. The system utilizes voice recognition software in order to control processing and data flow during order taking operations, and to receive order information from the server in real time during interaction with the customer. A relatively limited database of recognizable words define computing commands and order information. An audible feedback is provided to the server which is relatively unobtrusive, and which provides the server with a positive indication that the order information has been fully and correctly received and processed.

16 Claims, 10 Drawing Sheets

| | SERVER SPEAKS | ACTION BY POS SYSTEM | ECHO BACK TO SERVER |
|---|---|---|---|
| 1 | "OPEN TABLE 25" | SYSTEM OPENS A CHECK FOR TABLE 25 FOR WAITER 123 | "TABLE 25 CHECK 1 OPENED" |
| 2 | "WELCOME TO IBER CAFE" | NO ACTION | |
| 3 | "WHAT WOULD YOU LIKE FOR LUNCH" | NO ACTION | |
| 4 | "ONE COKE AND ONE SPRITE" | PLACE ONE COKE AND ONE SPRITE TO CHECK 1 | "ONE COKE" "ONE SPRITE" |
| 5 | "ONE BURGER" | PLACE ONE BURGER TO CHECK 1 | "ONE BURGER" |
| 6 | "ONE CHEESE PIZZA" | PLACE ONE CHEESE PIZZA TO CHECK 1 | "ONE CHEESE PIZZA" |
| 7 | "YOUR ORDER WILL BE RIGHT OUT" | NO ACTION | |
| 8 | "PLACE ORDER TABLE 25 CHECK 1" | PLACE ORDER AND MOVE TABLE 25 TO THE BACKGROUND | "PLACE ORDER FOR TABLE 25" |

| SPEECH RECOGNITION KEY WORDS | RESULTS TRAINING |
|---|---|
| ① "WELCOME" 401 | 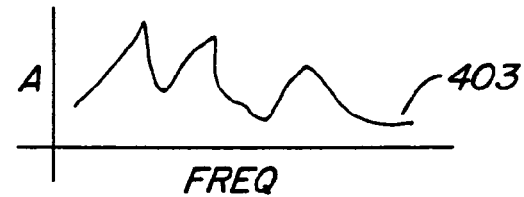 |
| ② "DRINK" 405 | 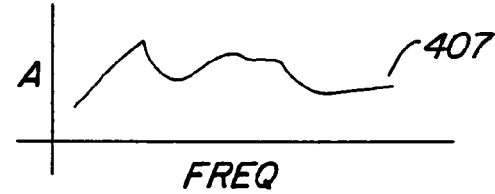 |
| ③ "APPETIZER" 409 | 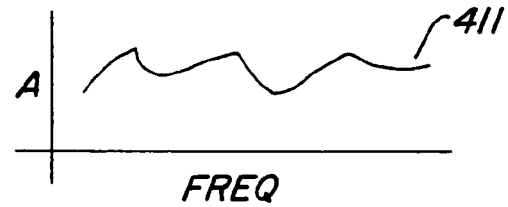 |
| ④ "MAIN MENU" 413 | 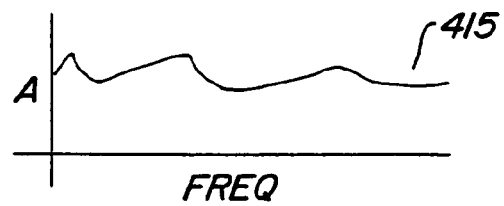 |
| ⑤ "CHECK" 417 | 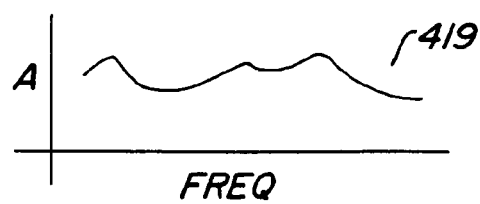 |
Fig. 5

| SERVER SPEAKS | ACTION BY POS SYSTEM | ECHO BACK TO SERVER |
|---|---|---|
| (1) "OPEN TABLE 25" | SYSTEM OPENS A CHECK FOR TABLE 25 FOR WAITER 123 | "TABLE 25 CHECK 1 OPENED" |
| (2) "WELCOME TO IBER CAFE" | NO ACTION | |
| (3) "WHAT WOULD YOU LIKE FOR LUNCH" | NO ACTION | |
| (4) "ONE COKE AND ONE SPRITE" | PLACE ONE COKE AND ONE SPRITE TO CHECK 1 | "ONE COKE" "ONE SPRITE" |
| (5) "ONE BURGER" | PLACE ONE BURGER TO CHECK 1 | "ONE BURGER" |
| (6) "ONE CHEESE PIZZA" | PLACE ONE CHEESE PIZZA TO CHECK 1 | "ONE CHEESE PIZZA" |
| (7) "YOUR ORDER WILL BE RIGHT OUT" | NO ACTION | |
| (8) "PLACE ORDER TABLE 25 CHECK 1" | PLACE ORDER AND MOVE TABLE 25 TO THE BACKGROUND | "PLACE ORDER FOR TABLE 25" |

Fig. 8

| SERVER SPEAKS | ACTION BY POS SYSTEM | ECHO BACK TO SERVER |
|---|---|---|
| ① "OPEN CHANNEL | • SEARCH FOR LISA<br>• IS LISA CONNECTED<br>• IF SO, OPEN COMMUNICATION CHANNEL<br>• NOTIFY LISA | "CHANNEL OPEN TO LISA" |
| ② "CLOSE CHANNEL TO LISA" | • CLOSE COMMUNICATION CHANNEL | "CHANNEL TO LISA CLOSED" |
| ③ ADJUST CHECK" | • LOCATE CHECK<br>• OPEN FOR ADJUSTMENT | "CHECK ADJUSTED" |

Fig. 10

POINT-OF-SALE CUSTOMER ORDER SYSTEM UTILIZING AN UNOBTRUSIVE TRANSMITTER/RECEIVER AND VOICE RECOGNITION SOFTWARE

CROSS-REFERENCE TO RELATED APPLICATION

Benefit is herein claimed of the filing date under 35 U.S.C. §§119 and/or 120, and 37 CFR §1.78 to U.S. Provisional Patent Application Ser. No. 60/230,681, filed on Sep. 7, 2000, entitled "POINT-OF-SALE CUSTOMER ORDER SYSTEM UTILIZING AN UNOBTRUSIVE TRANSMITTER/RECEIVER AND VOICE RECOGNITION SOFTWARE".

BACKGROUND OF THE INVENTION

1. Field of the Invention

The present invention relates in general to point-of-sale order systems, and in particular to point-of-sale order systems which find particular utility in restaurant or other food service applications.

2. Description of the Prior Art

All service businesses, including but not limited to the food service and restaurant industry, have made significant technological advancements in the last five years. The industry in general recognizes that throughput equates directly to profitability. Many service businesses, including restaurants, entice customers with guarantees of prompt service. Any delays in taking and filling the customer order results in a degradation of service and a loss of business. Most service businesses, including restaurant or other food service businesses, have migrated from a cash register system to a computer-implemented register and order system. In order to minimize the "bottleneck" associated with computer implemented register order systems, many restaurants have begun utilizing handheld devices which include keypads or touch screens which allow the waiters or waitresses to directly enter order information during interaction with the customer. One significant disadvantage of these systems is that the server is frequently distracted during the customer dialog and focuses more on the entry of information into the device than with customer contact. All together, this results in a less than satisfactory experience for the customer. Eye contact and customer interaction is necessary in order to generate customer loyalty and ensure repeat business. The present invention is directed to a relatively non-obtrusive point-of-sale order system which maximizes customer contact, while allowing the servers to place the orders during customer interaction, and thus avoid the bottlenecks and associated delays of the prior art systems.

SUMMARY OF THE INVENTION

It is one objective of the present invention to provide a point-of-sale order system which utilizes a relatively non-obtrusive transmitter-receiver device which includes a microphone device or system for receiving order information and a speaker device or system for receiving confirmation of the order information.

It is another objective of the present invention to provide a point-of-sale system which utilizes voice recognition software in order to control the processing and data flow during order taking operations, and to receive order information from the server in real time during interaction with the customer.

It is yet another objective of the present invention to provide a point-of-sale order system which utilizes the voice recognition system, in combination with a relatively limited database of recognizable words which define computing commands and order information, in order to increase the efficiency and reliability of the point-of-sale order system.

It is yet another objective of the present invention to provide an audible feedback to the server of the order information in a manner which is relatively unobtrusive, and which provides the server with a positive indication that the order information has been fully and correctly received an processed, preferably utilizing the speaker device or system.

Another objective of the present invention is to provide for a total communication system for the restaurant wherein all of the operational areas of restaurant are communicatively linked. For example, the food expediter system will announce to the waiter that the food is ready to be delivered to the customer. The table management system will advise the bus boy that a table is dirty and ready to be cleaned. A waiter can open a channel to any other waiter or to the manager to ask or communicate anything.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of the preferred embodiment when read in conjunction with the accompanying drawings, wherein:

FIG. 5 is a simplified tabular representation of the database created during training operations in accordance with the preferred embodiment of the point-of-sale order system of the present invention;

FIG. 8 is a tabular representation of an order taking interaction and corresponding system responses and echo-back transmissions, all exemplary of a preferred embodiment of a point-of-sale order system in accordance with the present invention;

FIG. 10 is a tabular representation of other miscellaneous functions which may be performed utilizing the point-of-sale system of the present invention.

DETAILED DESCRIPTION OF THE INVENTION

Figure 1:
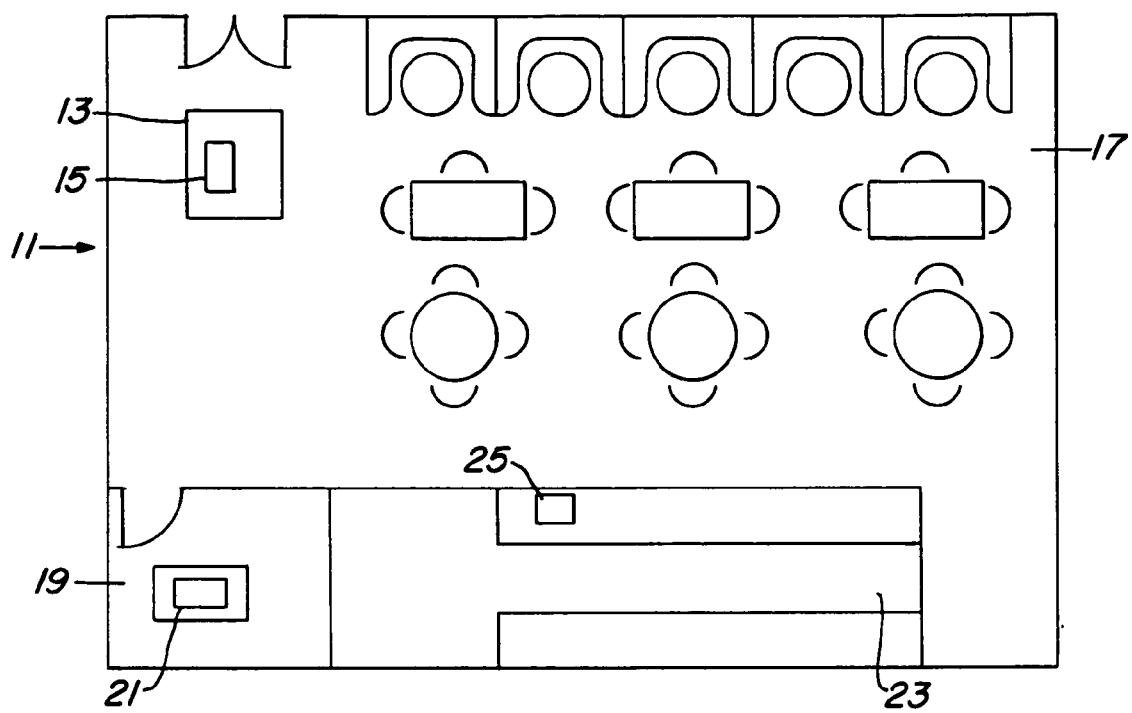
FIG. 1 is a simplified plan view of a restaurant establishment.

The present invention is directed to an improved point-of-sale customer order system which is useful for any service business, but it will be described in this patent application as being used in a restaurant. FIG. 1 is a simplified and pictorial plan view representation of a restaurant establishment 11. The present invention allows the coordinated and automated cooperation of various working components of restaurant establishment 11 including register area 13 with point of sale system (POS) 15, dining area 17, office area 19 with computer-controlled accounting system 21, and kitchen area 23 with order display system 25. One or more cashiers work the cash register area 13, one or more restaurant managers work in the office area 19, kitchen staff work in kitchen area 23, and servers work in dining area 17.

Figure 2:
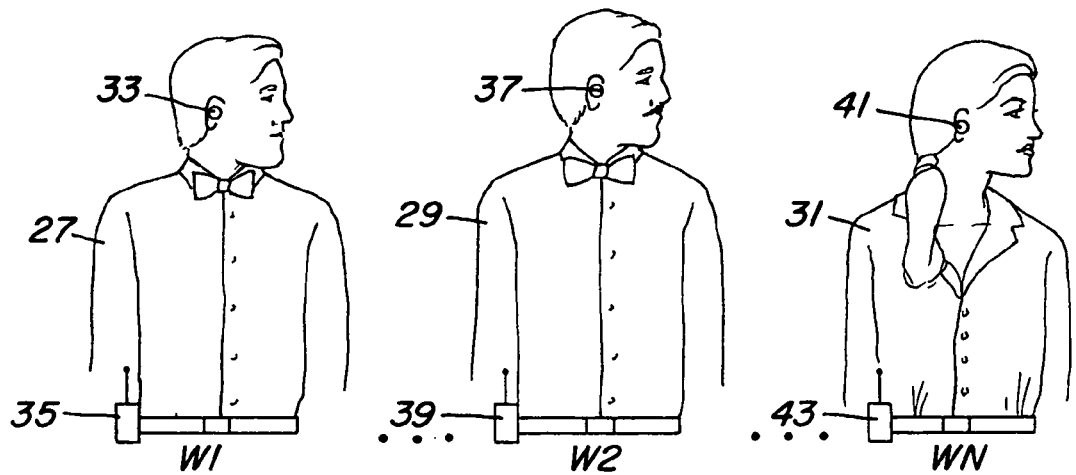
FIG. 2 is a pictorial representation of an exemplary serving staff of a restaurant establishment equipped in accordance with the present invention.

FIG. 2 is a pictorial representation of the service staff including servers 27, 29, and 31. As is shown, server 27 is equipped with an earpiece 33 which performs the combined functions of a microphone and a headset. Earpiece 33 is electrically coupled to receiver/transmitter device 35 which is carried on the belt of server 27. The other servers are likewise equipped with earpieces 37, 41, and receiver/transmitter devices 39, 43. The servers 27, 29, 31 are able to interact with the point of sale system (POS) 15, kitchen display 25, and office computer 21 utilizing the receiver/transmitter devices 35, 29, 43. This earpiece serves the dual function of a microphone for sensing the speech of servers 27, 29, 31 and a speaker for providing messages from the other restaurant personnel or from the computer-controlled order and register system in accordance with the present invention. The earpieces 33, 37, 39, 41 are relatively non-obtrusive. This is especially true in comparison with the alternative prior art devices which include rather bulky headsets and microphones which extend over a portion of the face of the wearer.

Figure 3:
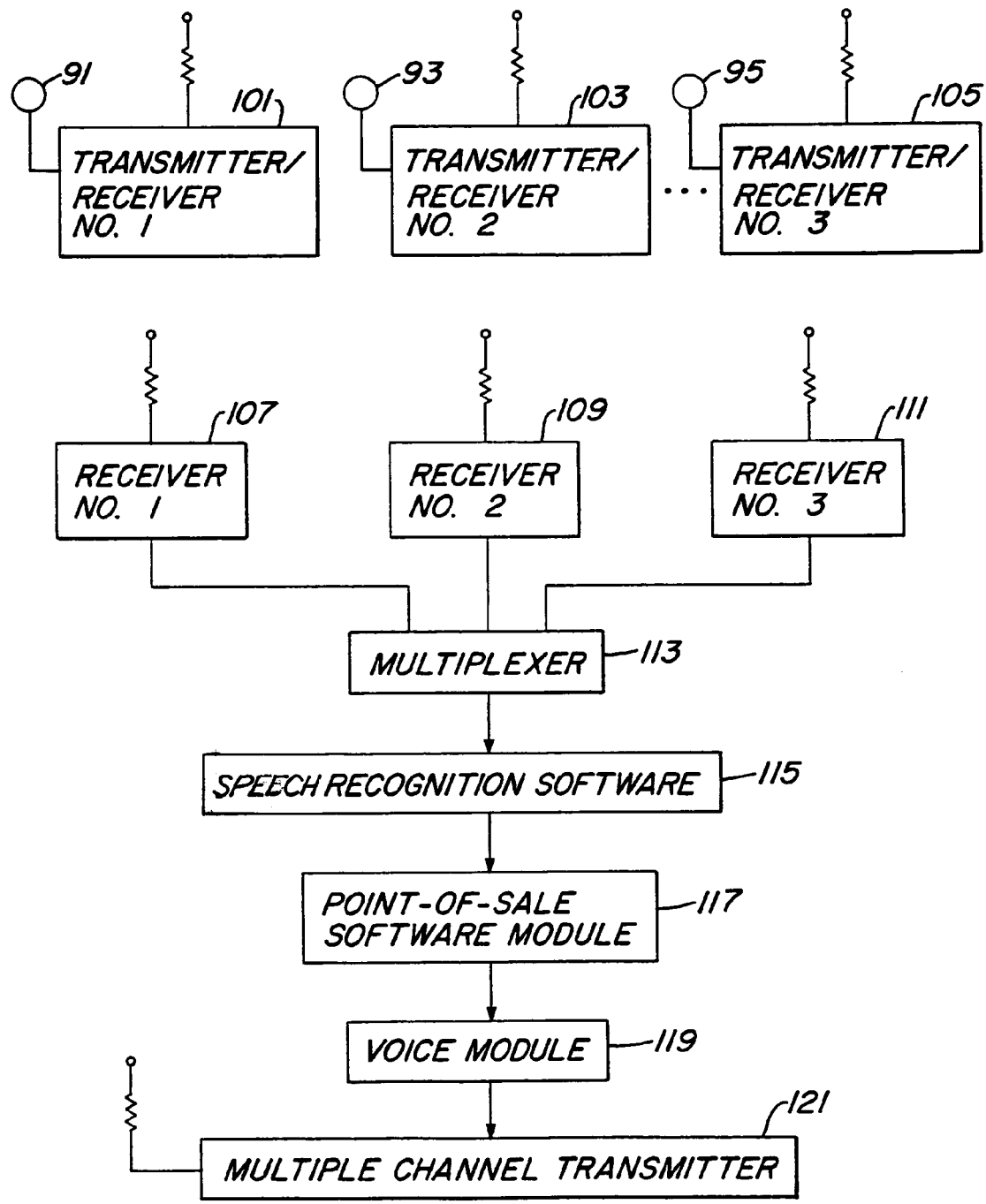
FIG. 3 is a block diagram representation of the hardware and software utilized in the point-of-sale order system of the present invention.

FIG. 3 is a block diagram representation of the hardware utilized in accordance with the point-of-sale order system of the present invention. As is shown, earpieces 91, 93, 95 are electrically connected to transmitter/receiver devices 101, 103, 105. Receivers 107, 109, 111 are provided to receive transmissions from transmitter/receiver devices 101, 103, 105. The devices may communicate at different frequencies or utilizing different coding schemes in order to allow for independent operation of these devices without risking interference between the devices. Receiver devices 107, 109, 111 provide their output to multiplexer 113, which multiplexes the signal, and passes it to voice recognition software 115.

The voice recognition software 115 takes the analog serial signals from the multiplexer 113, and produces a digital command to the point of sale with separate codes for each channel to the point-of-sale software module 117. The point-of-sale software module 117 processes the text strings in a predetermined manner, and then produces an "echo back" text string which is parsed through voice module 119 (which is a text-to-speech device) which receives the text string and produces a voice output which is passed to multiple channel transmitter 121 which transmits the voice "echo back" message to the servers' transmitter/receiver units 101, 103, and 105.

Utilization of the voice recognition software allows a server to open a table, place orders, print guest checks, close out the checks, and perform either point-of-sale functions through voice interaction with the computing system. This is done in a very unobtrusive manner since all microphone and headset functions are performed utilizing the relatively low profile, and non-obtrusive earpiece. All the computer commands and order information are transmitted by the server utilizing voice commands over a wireless communication link. The server will take the customer order at the table and the computer system will be listening to the dialog in the background for the detection of anyone of a relatively small set of predetermined and pretrained voice commands. The system will pick-up the order as the waiter naturally speaks with the customer. The system will post order information to the customer check and to the display in the kitchen and will confirm through the "echo back" transmission to the server that the order has been placed, without requiring any further interaction by the server with the computer system. This streamlines the ordering process and provides a greatly more efficient system than can be found in the prior art.

Figure 4:
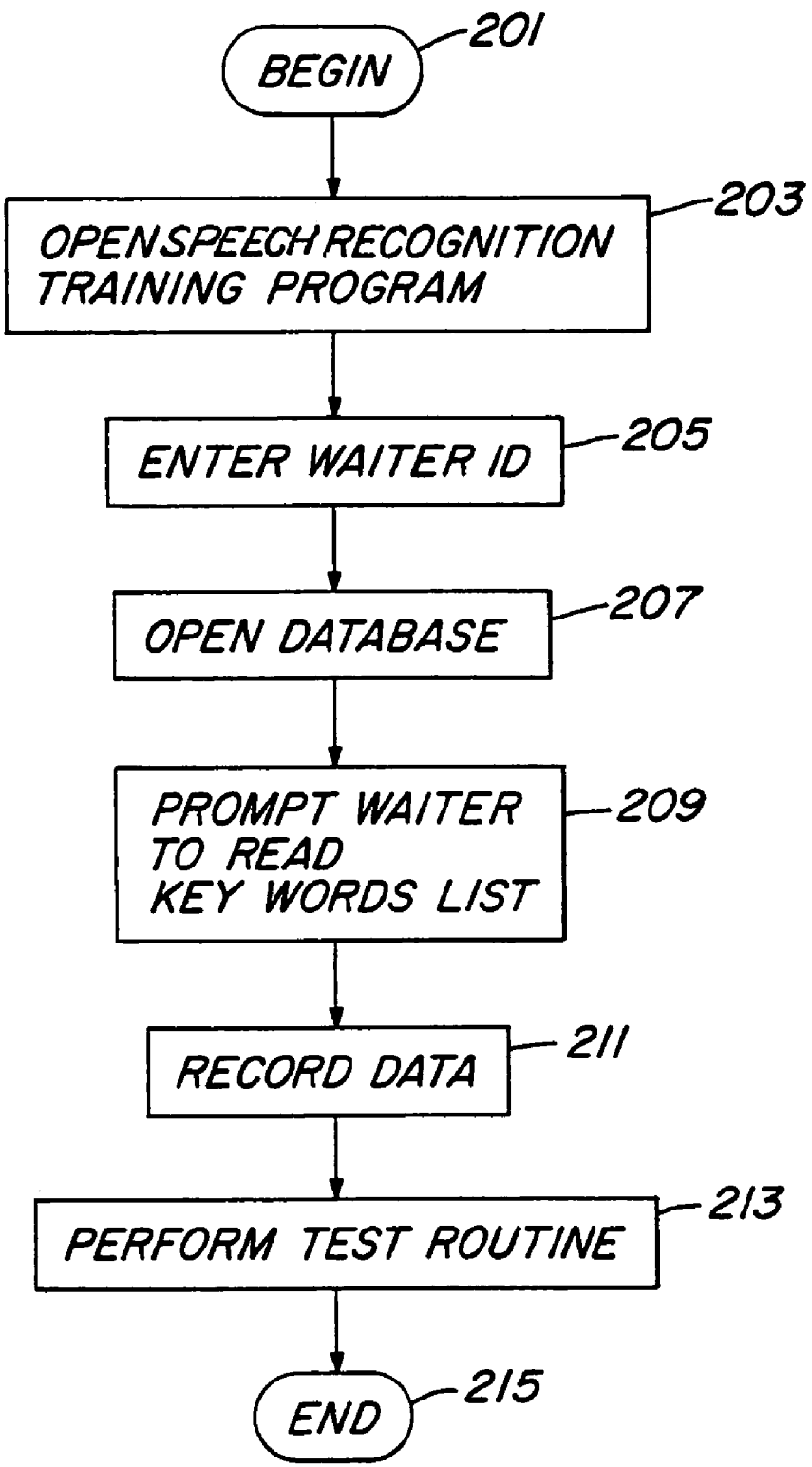
FIG. 4 is a flowchart representation of the training operations performed utilizing the preferred embodiment of the point-of-sale order system of the present invention.

As a prerequisite for utilization of the point-of-sale order system of the present invention, each server must interact with the voice recognition software during a training operation in order to train the voice recognition software to identify particular words from a very limited vocabulary which includes data flow commands and items on the restaurant's menu. FIG. 4 is a flowchart representation of the training operations performed utilizing the voice recognition system. The process begins at block 201 and continues at block 203, wherein the voice recognition training program is opened. Then, in accordance with block 205, the server identification is entered into the system. Then, in accordance with block 207, a database is opened for that particular server identification. Next, in accordance with block 209, the server is prompted by the computer program to read words from a keywords list. The keywords list will include items which are on the restaurant menu. The keywords list will also include commands which control data flow. Then, in accordance with block 211, the voice recognition software records the voice data for the particular server. Then, in accordance with block 213, the voice recognition software then prompts the server to enter into a test routine in order to test the reliability of the training operations. Then the process ends at block 215.

In the present invention, while the server talks to the customer the system is listening in the background and placing the order. Also, in the present invention, the server does not have to go to a point of sale terminal in order to do simple tasks like: open a check, close a check, print a check and so on.

Also, the system will unite all the restaurant staff as a single unit, giving the manager better control of how to better use his staff.

The voice recognition training operations can be better understood with reference to FIG. 5. FIG. 5 is a tabular presentation of particular keywords on the keyword list and corresponding training results represented in a graph of signal amplitude with respect to frequency. As is shown, the "welcome" command 401 is identified with graph 403. The "drink" command 405 is identified in the database with graph 407. The "appetizer" command 409 is identified with graph 411. The "main menu" command 413 is identified with graph 415. The "check" command 417 is identified with graph 419. Each server will have a different voice recognition database associated with him or her which maps particular keywords and commands (including menu items) to particular data which is maintained in a voice recognition database. FIG. 5 is merely a simplified graphical representation of such a database.

Figure 6:
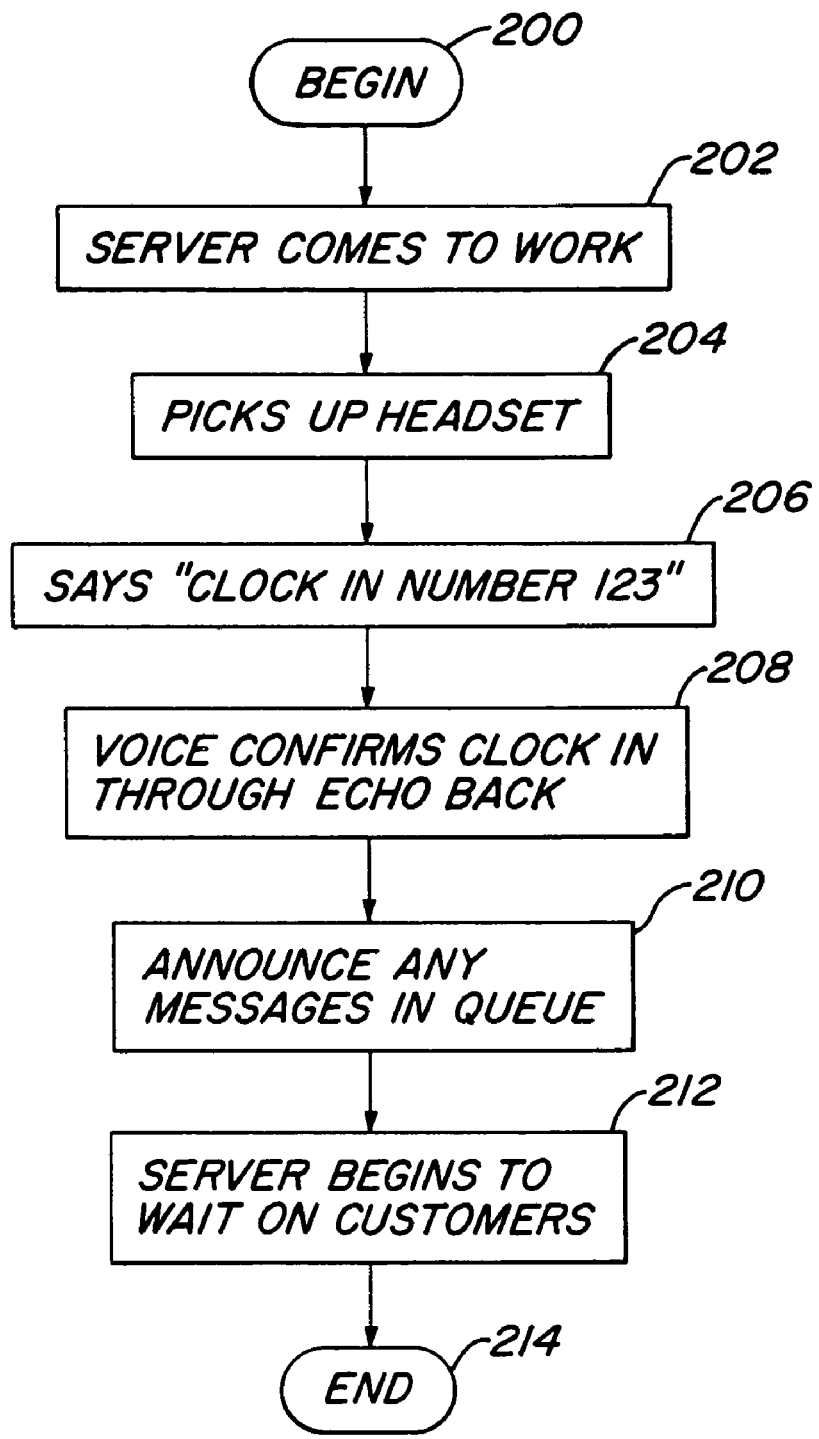
FIG. 6 is a flowchart representation of a clock-in conducted in accordance with the preferred embodiment of the point-of-sale order system of the present invention.

FIG. 6 is a flowchart representation of the clock-in-procedures in accordance with the preferred embodiment of the point of the sale system of the present invention. The process begins at block 200, and continues at block 202, wherein the server comes to work. In accordance with block 204, the server picks up a headset which is assigned to him or her, and which utilizes a particular frequency for reception and transmission of messages. In accordance with block 206, the server speaks into the microphone and says "clock in number 123." The number "123" corresponds to the server's identification in the system. The point-of-sale system converts this voice message into text, parses it, and executes program instructions upon a determination that a "clock in" operation is requested. In accordance with block 208, the point-of-sale system generates an audible response in an "echo back" operation, in which a voice confirmation of the "clock in" is provided through the echo back. The system may ask for a password if the system has one. Next, in accordance with block 210, the point-of-sale system provides to the server any messages which are queued up for the server's attention. These may be audible "voice mail" messages which have been recorded in memory for the server and which are provided to the server upon each "clock in" operation. Then, in accordance with block 212, the server begins to wait on customers, and the flow terminates at block 214.

Figure 7:
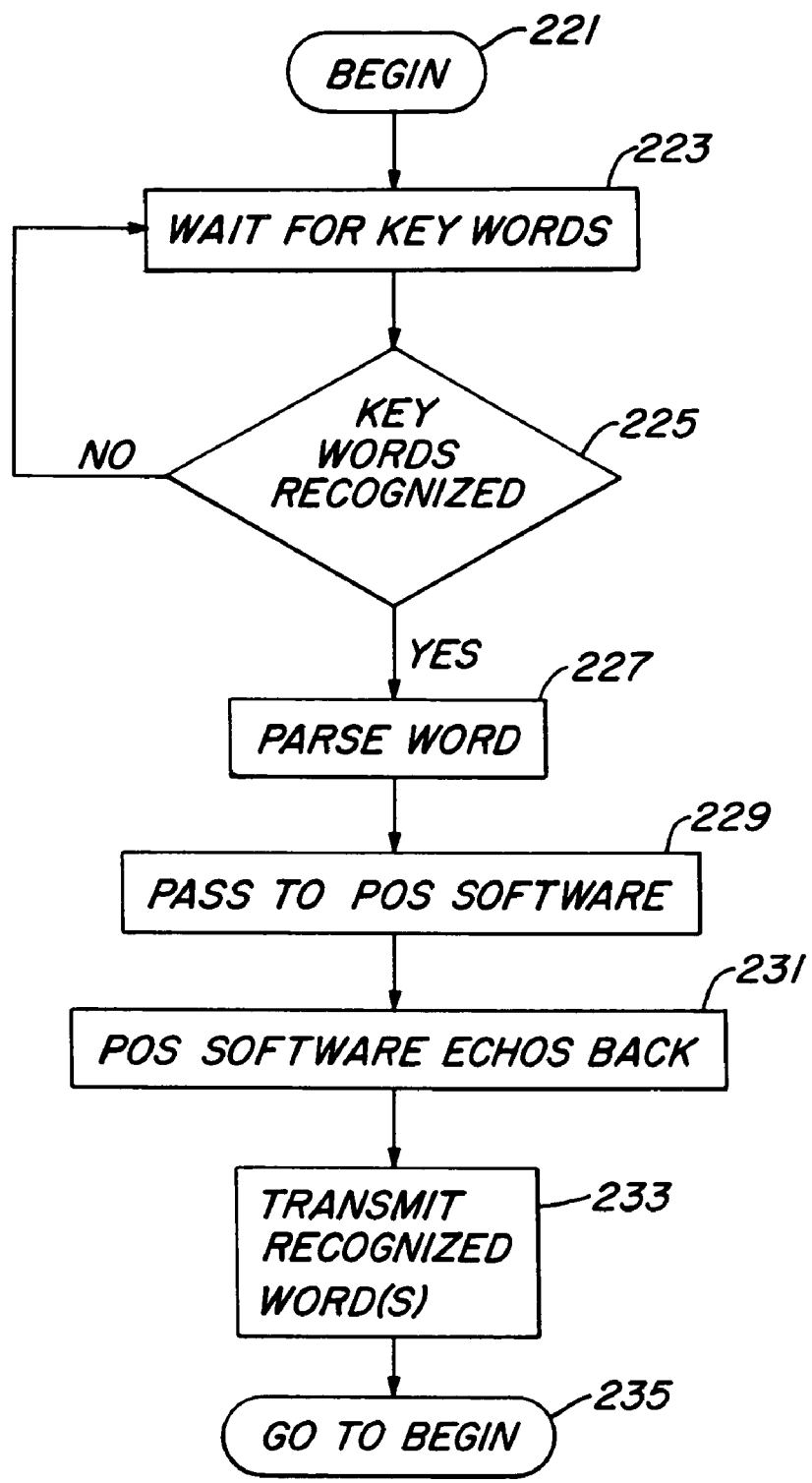
FIG. 7 is a flowchart representation of the voice recognition performed with the preferred embodiment with the point-of-sale order system of the present invention.

FIG. 7 is a flowchart representation of the processing of the voice commands in order information. The process begins at block 221, and continues at block 223, wherein the point-of-sale system waits for the detection of key words which have been preprogrammed during the training mode of operation. The voice recognition system listens to the servers and passes the command to the point of sale. In accordance with block 225, the point-of-sale system monitors the words received to determine whether any key words are recognized. If no key words are recognized, control returns to block 223; however, if key words are recognized, control passes to block 227. In accordance with block 227, the text stream is parsed. Recognized words are then passed to the point of the sale software block in accordance with block 229. The point-of-sale software processes the received words in a manner which posts information to an order or which performs any other predetermined operation for a particular order that is allowed under the system. When this operation is complete, the point-of-sale software generates a "echo back" signal which provides an audible confirmation to the server that the order information and/or order command has been received and properly processed. In accordance with block 223, the particular recognized words are transmitted back to the server through the echo back operation, and control passes to block 235, wherein the process is routed back to begin block 221.

FIG. 8 provides a tabular representative depiction of a dialog and associated processing during order interaction between a server and one or more customers. The first column represents words spoken by the server. The second column represents actions performed by the point-of-sale system. The third column represents the "echo back" confirmation provided to the server. Eight particular portions of the exemplary order conversation are identified, and enumerated in row form (with numbers 1 through 8). In item number 1, the server says "open table 25." This results in the point of the sale system opening a check for table 25 for waiter number 123. Then, the point-of-sale system causes the generation of an echo back confirmation which states "table 25 check 1 opened." For item number 2, the server says "welcome to Iber Café." Since this does not represent any key words programmed in memory, no action is taken by the point-of-sale system, and no "echo back" confirmation is provided. For item number 3, the server says: "What would you like to have for lunch?" Again, this does not correspond to any preprogrammed key word, so no action is taken by the point-of-sale system, and no echo back confirmation is provided. For the fourth item, the server has asked the customers what would they like to have for their drinks. The server says "one Coke and one Sprite." The point-of-sale system is preprogrammed to identify these items and to act on such identification. Accordingly, the point-of-sale system places an order to the check for table 25 of one Coke and one Sprite. In order to provide confirmation that the commands have been received and acted upon, an echo back confirmation is provided which says "one Coke" and "one Sprite." With item number 5, the dialog continues with the server taking the entree orders. The server confirms the order to the customer and says "one burger," and the point-of-sale system responds by placing an order for one burger to check number one. Additionally, the point-of-sale system responds to this order by providing an echo back conformation of "one burger." For item number 6, the server places the order of one cheese pizza by stating "one cheese pizza" to confirm the order. The point-of-sale system responds by placing an order of one cheese pizza to check number one. Additionally, the point-of-sale system responds by providing an echo back confirmation of "one cheese pizza." For item number 7, the server says "your order will be right out." Since this does not correspond to any preprogrammed keywords, no action is taken by the point-of-sale system, and no echo back confirmation is provided. As the server departs from the table he or she states "place order 25 check one." This results in the point-of-sale system placing the order and moving table 25 to the background of its processing stack. Additionally, the point of the sale system provides an echo back confirmation of "place order for table 25." In this manner, the server is able to interact with the point-of-sale system without the physical manipulation of a keyboard or graphical user interface. Additionally, the server is able to interact with the point-of-sale system in a manner which uses portions of the dialog between the server and the customers, so the interaction looks natural and allows the server to pay full attention to the customers.

Note that the commands are "masked" as ordinary dialog commonly utilized by servers in their interaction with customers. The server can call particular voice recognition routines and open particular portions of the customer's check utilizing ordinary language such as "drink order," "appetizer," "main course," and "check." The data flow of FIG. 6 is merely representative of certain types of data flow. Many other and different data flows may be implemented utilizing the concepts of the present invention.

Figure 9:
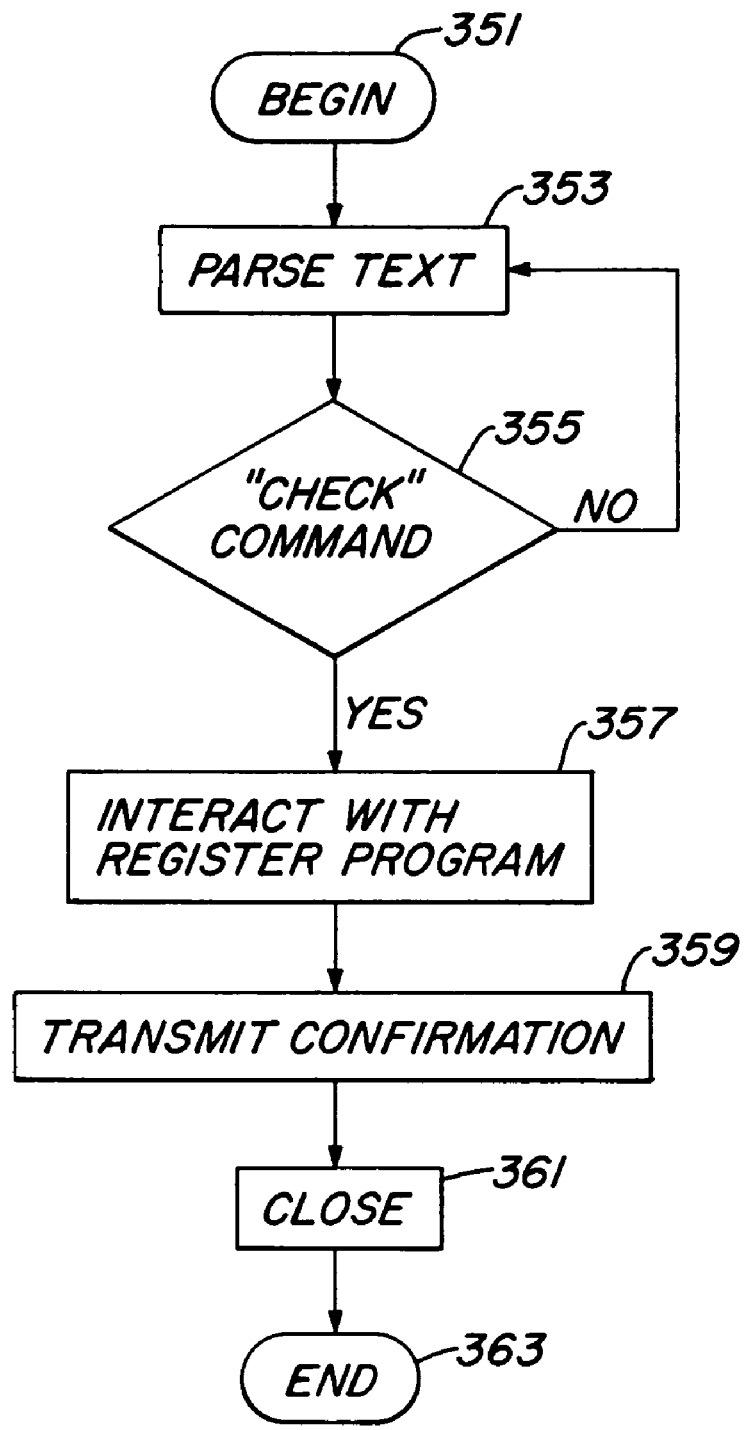
FIG. 9 is a flowchart representation of the "register" routine in accordance with the preferred embodiment of the point-of-sale order system of the present invention.

FIG. 9 is a flowchart representation of the "register routine" in accordance with the preferred embodiment of the present invention. The process commences at block 351 and continues at blocks 353, 355, wherein the text generated by the voice recognition system is parsed in order to identify the "check" command. Once the "check" command is received, the point-of-sale order system interacts with the register program in accordance with block 357 in order to "ring-up" the order. Next, in accordance with block 359, the point-of-sale order system generates and transmits a confirmation signal to the server which identifies that the account has been "closed" and that the receipt has been "rung-up." Then, the routine is closed in accordance with block 361 and the process ends in accordance with block 363.

FIG. 10 is a tabular presentation of other additional functions which may be performed utilizing the improved point-of-sale system of the present invention. Column 1 represents dialog spoken by the server. Column 2 represents actions taken by the point-of-sale system in response to detection of key words. Column 3 represents the echo back confirmation signal provided by the point-of-sale system to the server to confirm receipt and processing of the order. The functions depicted in FIG. 10 are miscellaneous functions which facilitate operations of the service establishment. The dialog items of column one will now be discussed. In accordance with the preferred embodiment of the present invention, if the server speaks the words "open channel to Lisa" the point-of-sale system responds by searching for an identification of "Lisa" in its database of registered servers. If Lisa is connected to the system, then the point-of-sale system then opens a communications channel via the radio frequency transmitter/receiver device to allow voice communication to Lisa. Then, the point-of-sale system notifies Lisa that the communication channel is being opened. Additionally, the point-of-sale system generates a "echo back" notification to the server which states that "channel open to Lisa." This provides notification to the server that the channel has been opened to allow voice communication with Lisa. When the server desires to close the communication channel, he or she merely speaks "close channel to Lisa" and the point-of-sale system responds by closing the communication channel and providing an echo back notification to the server (as well as to Lisa) that the "channel to Lisa closed." Other functions relating to the operation of the service establishers may also be accomplished utilizing voice commands sent to the point-of-sale system. For example, the third item in column one requires the speaker to say "adjust check." The point-of-sale system responds by locating the check, and opening the check for adjustment. Once the adjustment is completed in accordance with the predetermined key words for the adjustment, the echo back is provided to the server of "check adjusted." A variety of other functions can be performed including changes to an order, the entry of reservations, or the communication of any special requirements for the items ordered.

The system of the present invention is not intended to completely replace a point of sale system. There are other, more complex, functions that need to be performed at a point of sale terminal. The present invention is intended to be used at 80% of the normal everyday interaction that happens at a normal restaurant.

One significant advantage of the present invention is that the server may interact with the point-of-sale customer order system utilizing language which is familiar to the restaurant patrons. The greeting "welcome" may simultaneously be a welcoming of the restaurant patron, while also serving as a command to the automated point-of-sale order system to open a ticket. Likewise, the statement to the customer "I will bring you your check" conveys that information to the customer, but may also cause the tabulation and printing of the check. Likewise, the dialog between the server and the customer concerning drink orders, appetizer orders, and main menu orders also serves multiple purposes of soliciting, entering, and confirming the order information. Similarly, when particular items are ordered, the server repeats the items in a manner which simultaneously confirms the particular orders placed, while posting those orders to the open ticket. Altogether, the point-of-sale order system of the present invention provides a very non-obtrusive order system which maximizes the server and customer interaction by utilizing that interaction in a relatively scripted way in order to simultaneously confirm order information and to post items to an open ticket.

Figure 11:
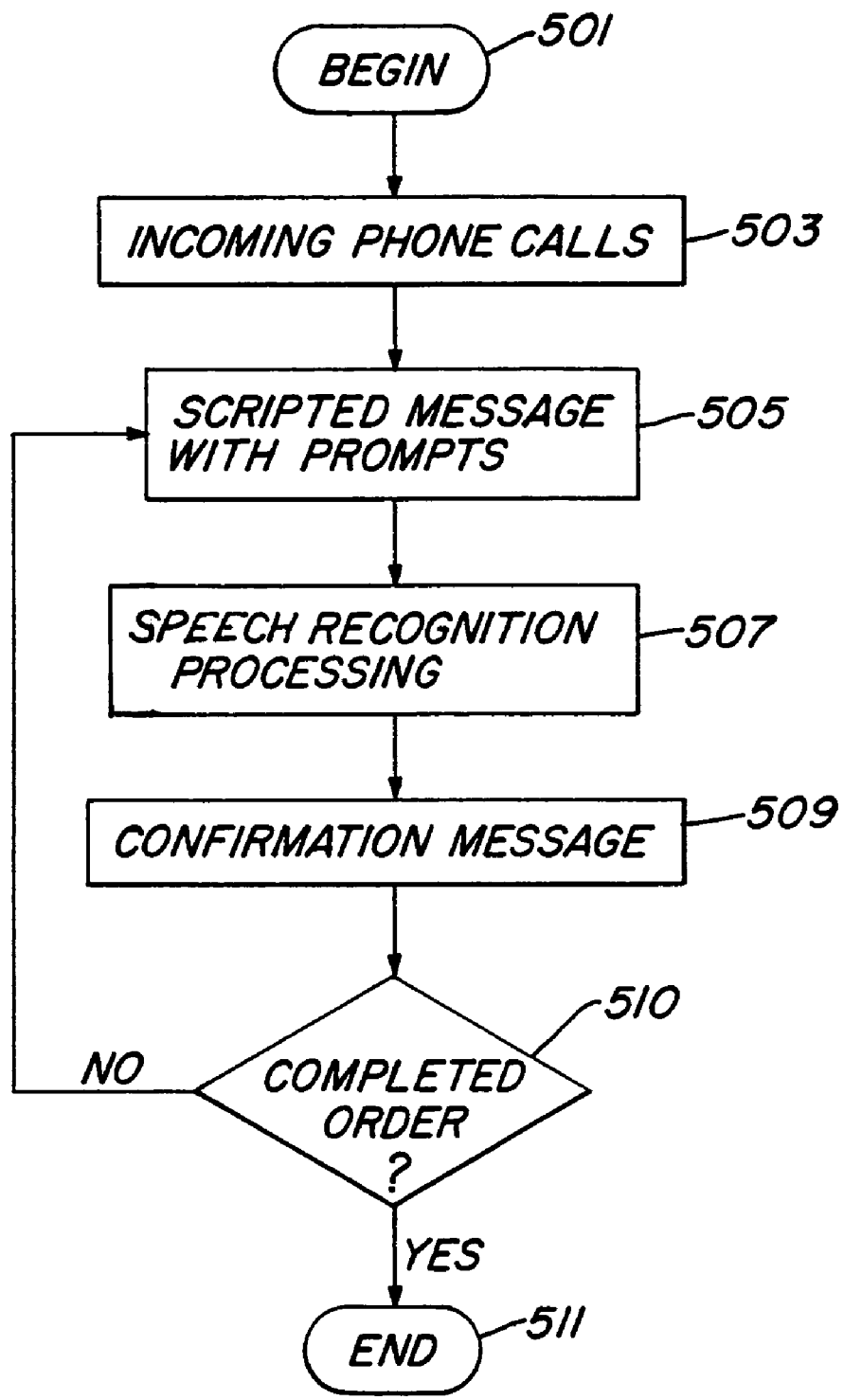
FIG. 11 is a flowchart representation of utilization of the present invention for telephone orders.

As an alternative to utilization of the present invention in a "live" interaction between a wait person and a customer, the present invention may be utilized in a scripted interaction between a customer and an automated telephonic order taking system. This is graphically depicted in flowchart form in FIG. 11. The process begins at block 501, an continues at block 503, wherein an incoming phone call is received. In accordance with block 505, a computer moderated dialog is initiated which includes scripted message portions with prompts interspersed throughout the message. The script would walk the customer through a list of options, and receive the customer's order by analyzing voice commands, as opposed to analyzing a customer selection of order choices through DTMF tones as is conventional in most automated telephone systems. In accordance with block 507, the present invention utilizes voice recognition processing, as discussed above, to recognize voice commands, and to determine the content of the order. In accordance with block 509, the computer moderated system provides confirmation of menu selections by providing confirmation messages which are generated utilizing a voice sensitive module, as discussed above. In accordance with block 510, the menu monitors for completion of the order. If the order is not completed, processing returns to block 505. However, if the order is completed, control passes to block 511, wherein processing ends. This system may be utilized to take order and payment information, as well as delivery information.

Although the invention has been described with reference to a particular embodiment, this description is not meant to be construed in a limiting sense. Various modifications of the disclosed embodiments as well as alternative embodiments of the invention will become apparent to persons skilled in the art upon reference to the description of the invention. It is therefore contemplated that the appended clams will cover any such modifications or embodiments that fall within the scope of the invention.

The invention claimed is:

1. A method of using a speech recognition system for enabling a human server in entering restaurant food orders as a background task unobtrusive to a customer, comprising the steps of:

providing at least one server with a non-obtrusive receiver-transmitter device which includes at least a microphone for communicating order information from the server and a speaker for receiving confirmation of the order information by the server;

providing an order processor having a speech recognition software module for receiving the order information communication from the microphone of the server by listening in real time during the server's interaction with the customer and for processing the communication from the server according to a previous spoken word training operation to provide order information to the order processor; and confirming the order information to the server from the order processor by providing an echo back message to the server;

wherein communicating the order information and confirming the order information occur non-obtrusively as background tasks to an order dialog between the at least one server and the customer.

2. The method of claim 1, wherein the step of providing a receiver-transmitter device further comprises the step of:

providing a receiver-transmitter electrically connected to an earpiece; and combining the functions of the microphone device and the speaker device in the earpiece.

3. The method of claim 1, wherein the step of providing an order processor further comprises the steps of:

training the speech recognition software module to recognize words spoken by a server associated with a server identification and corresponding to food items listed on a menu, computing commands, and order information.

4. The method of claim 1, wherein the step of providing an order processor having a speech recognition software module further comprises the step of:

linking the speech recognition software module to a database having stored therein recognizable words that define food items listed on a menu, computing commands and order information.

5. The method of claim 1, wherein the step of providing an order processor having a speech recognition software module further comprises the step of:

listening in the background, as the server speaks to a customer, and entering as an order a menu item corresponding to a word or words spoken by the server that are associated in a database therewith.

6. The method of claim 5, wherein the step of listening further comprises the step of:

listening for command words spoken by the server that are masked as ordinary dialog between the server and a customer.

7. The method of claim 1, wherein the step of confirming further comprises the step of:

providing an audible feedback from the order processor to the server using the speaker of the receiver-transmitter device.

8. The method of claim 7, wherein the step of providing further comprises the step of:

providing an echo back transmission of the server's order information when the order information has been entered.

9. The method of claim 1, further comprising the steps of:

providing a communication system linking a point-of-sale device, a food expediter system, and a table management system; and coupling the receiver-transmitter of each server to the communication system.

10. The method of claim 1, further comprising the step of:

operating the speech recognition software module in a scripted interaction between a customer and an automated telephonic order taking system coupled to the order processor.

11. Apparatus for entering restaurant food orders given to a human server as a background task unobtrusive to a customer, comprising:

a point-of-sale (POS) system having a speech recognition software module coupled to an order processor;

a wireless communication link, provided between the server and the order processor in the POS system, for providing order entry by listening in realtime during the server's interaction with the customer and confirmation thereof in real time by providing an echo back message to the server unobtrusively as a background task to the dialog occurring between the server and the customer; and a database coupled to the speech recognition software module for storing a set of key words corresponding to menu items and computing commands spoken by the server, the key words stored in association with a server identification according to a previous spoken word training operation.

12. The apparatus of claim 11, wherein the speech recognition software module further comprises:

a speech module having a text-to-speech device for parsing a text string retrieved from the database by the order processor and converting it to a spoken echo back to the server to confirm an order.

13. The apparatus of claim 11, wherein the wireless communication link further comprises:

an earpiece worn unobtrusively by the server, the earpiece coupled to the receiver-transmitter device worn by the server for non-obtrusive communication with the order processor in the POS system to enter an order and receive the echo back message confirmation of the order; and a communication interface coupled to the order processor in the POS system for non-obtrusively receiving an order for entry from the server and transmitting the echo back message order confirmation to the server.

14. The apparatus of claim 13, wherein the earpiece further comprises:

a microphone for communicating order information from the server; and a speaker for receiving confirmation of the order information by the server.

15. The apparatus of claim 13, wherein the communication interface further comprises:

an individual receiver associated with each server; and a multiple channel transmitter for transmitting via an echo back message to the receiver-transmitter device worn by a server.

16. The apparatus of claim 11, wherein the database further comprises:

stored recordings of the key words, spoken by individual servers during the training operation and corresponding to menu items and computing commands, in association with a server identification, and used by the order processor for entering and confirming an order and for causing other related operations responsive to commands spoken by the server.

* * * * *